US006256309B1

(12) United States Patent
Daley et al.

(10) Patent No.: US 6,256,309 B1
(45) Date of Patent: Jul. 3, 2001

(54) QUALITY OF SERVICE SENSITIVE ROUTES PRECOMPUTED IN BANDWIDTH BRACKETS

(75) Inventors: Patrick D. Daley, Belmont; David A. Hughes, Mountain View, both of CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/069,063

(22) Filed: Apr. 28, 1998

(51) Int. Cl.$^7$ .................................................. H04L 12/28
(52) U.S. Cl. ............................................................ 370/395
(58) Field of Search ................................... 370/216, 217, 370/221, 225, 229, 230, 232–234, 235, 254, 238, 255, 395, 400–401

(56) References Cited

U.S. PATENT DOCUMENTS 6,041,059 * 3/2000 Joffe et al. ............................ 370/412

OTHER PUBLICATIONS

Anthony Alles, "ATM Internetworking", pp. 1–58 (5/95).
Whay C. Lee, Michael G. Hluchyi and Pierre A. Humblet, "Routing Subject to Quality of Service Constraints in Integrated Communication Networks", *IEEE Network*, pp. 46–55 (Jul./Aug. 1995).

ATM Forum 94–0471R12, *Appendix H: Route Generation Algorithm*, pp. 256–263.

ATM–Forum_95–0099 "A Sample Algorithm for Route Generation" ATM Forum Technical Committee PNNI Sub-working Group, pp. 1–7 (Jan. 26, 1995).

Black, ATM Foundation For Broadband Networks, pp.: 141–142, 208–214, 223–229, 241,248–249, 1995.*

* cited by examiner

*Primary Examiner*—David R. Vincent
(74) *Attorney, Agent, or Firm*—Blakely, Sokoloff, Taylor & Zafman LLP

(57) ABSTRACT

A routing scheme generates a selection of precomputed routes that provide a wide range of available bandwidths while keeping delay (e.g., measure by cell transfer delay and cell delay variation), or cost, to a minimum, thus enabling high call rates at an overall lower call blocking rate. The routing scheme achieves this end by generating routes using a set of preconfigured bandwidth thresholds for pruning lower bandwidth links while least-cost optimizing on delay-based optimization functions, using for example, maximum cell transfer delay and maximum cell rate, or a cost-based function, using for example, administrative weight. The optimization function is determined during configuration by the selection of either cost-based or delay-based routing.

43 Claims, 3 Drawing Sheets

SELECT OPTIMIZATION FN.
72

↓

GENERATE ROUTES FOR BANDWIDTH BRACKETS USING SELECTED FN.
74

QUALITY OF SERVICE SENSITIVE ROUTES PRECOMPUTED IN BANDWIDTH BRACKETS

FIELD OF THE INVENTION

The present invention is related to routing methodologies for packet and/or cell switched networks and, in particular, to the optimization of such methods for either cost-based or delay-based routing.

BACKGROUND

Asynchronous Transfer Mode (ATM) is a connection oriented system. As such, connection requests need to be routed from a requesting node through the ATM network to a destination node. The ATM Forum has defined a private network-to-network or node-to-node interface (PNNI) protocol which allows easier interconnection of ATM switches. The PNNI protocol consists of two components. The first is a signaling protocol used to relay ATM connection requests within a network between a source and a destination. The second is a routing protocol used to determine the path for routing signaling requests though the ATM network. The goal of the PNNI protocol is to advertise enough information between the nodes of a network so as to allow the nodes to route call requests within the network. Ideally, every ATM switch in a network would not only know the address of every ATM attached installation but also the current available composite (VPI/VCI) for new switched virtual circuits (SVCs) to every switch. However, as ATM networks grow to include hundreds or even thousands of switches supporting tens of thousands of users and devices, such an implementation becomes unfeasible.

Nevertheless, finding the shortest or best available path from one point to another across an ATM network does require that each node know something about what the network looks like. For example, each node must know its own whereabouts in the network and be able to locate other nodes or ATM installations so that it can establish virtual circuits offering the appropriate speed and quality of service (QoS) parameters. The solution devised by the ATM Forum is a scheme that distributes and summarizes network topologies so that nodes have detailed information about their local topology and summarized information about more distant regions of the network. The PNNI protocol manages this information through the use of an hierarchical topology, along with an addressing scheme similar to that used in telephony networks.

For each node (e.g., switch) of an ATM network, a PNNI interface associates a connection between two nodes and the connection may be a physical link or a virtual path connection (VPC). In general, every PNNI-capable node has several such interfaces and each is associated with a set of parameter (usually stored in a data structure in memory), including a traffic metrics table that stores the available traffic resource parameters on the link associated with the interface (in the forward direction). These traffic metrics tables are generally two-dimensional and associate service classes with the type of traffic metrics or attributes supported by the connection. In one sense, PNNI is a link state algorithm and QoS-based routing protocol which can collect and advertise these link state parameters (i.e., the attributes and metrics that are associated with each link and node) which become the bases for routing path selections within the network.

Using PNNI, then network nodes are provided with "reachability information" (i.e., based on the traffic metrics and attributes) about other nodes. This reachability information is used by a source node to construct a designated transit list (DTL) that describes a complete route to a destination node. The DTL is inserted into a signaling request which is then transmitted along the path described by the DTL. Thus, using PNNI, a single connection will be set up between the source node and the destination node.

ATM nodes configured to use the PNNI routing protocol advertise the reachability of a particular ATM address over multiple ATM physical links. The various levels of the switching hierarchy established by PNNI, map different segments of the overall ATM network in different degrees of detail. By breaking a large network of ATM switches into smaller domains called peer groups, PNNI allows individual switches to navigate paths through the entire network without requiring them to store an entire map of the network in memory. PNNI organizes nodes into peer groups and nodes within a peer group elect a leader node called a peer group leader. The peer group leader summarizes information about the peer group and presents that information to the next higher level hierarchy and also instantiates a logical group node (LGN) at the next higher level. The LGN represents its own child peer group at the lower level and becomes the peer of other LGNs at its level.

Using PNNI then, nodes in an ATM network automatically form a hierarchy of peer groups according to addresses assigned by a network manager. The nodes' ATM addresses provide the key to the structure of this hierarchy. Each peer group has its own identifier (called a peer group ID), similar to a telephone exchange or area code. For a lower level peer group this ID is similar to an area code and exchange. For a higher peer group, it would be similar to just the area code. Finally, each node within a peer group has a unique address, similar to the way each line in a telephone exchange has a unique number.

Once the PNNI hierarchy is created, peer group leaders are allocated, and routing information is exchanged. Thereafter, the ATM nodes can begin to establish SVCs between various end-stations on the network. Using the PNNI protocol, installations on remote networks can easily establish SVCs across the hierarchy with other end stations and different peer groups.

When a signaling request is received across a user-to-network interface (UNI) by a ingress node, the node will use a shortest path algorithm, such as a Dijkstra calculation, to determine a path to connect the call to the desired destination. This calculation will create a set of DTLs, and each node will have: a full, detailed path within the source node's own peer group; a less detailed path within the parent peer groups; and even less detail on higher level peer groups, terminating in the lowest level peer group which is an ancestor of both the source and the destination nodes. Hence, using PNNI, SVCs can be set up across a network. Once the connection is established, ATM cells are forwarded by simple table lookups, e.g., using connection tables.

As indicated above, the PNNI specification requires that QoS sensitive source routing algorithms be used in the PNNI hierarchical routing environment. QoS sensitive routing implies that the route selection algorithm must determine whether a source route can support all of the QoS requirements of a request. This requires that the routing algorithm consider both link constraints and path constraints. Link constraints such as available bandwidth (AvCR) are relatively easy to deal with because links which do not meet a caller's requirements may simply be dropped or pruned from the topology during the shortest path calculation. However, path constraints such as cell transfer delay (CTD) and cell delay variation (CDV) are more difficult to deal with because they are not dependent on a single link only and, to date, no known routing algorithm is capable of optimizing for multiple path constraints.

Of the known routing algorithms (or shortest path algorithms), on-demand routing has gained some popularity. Indeed, one method of on-demand routing is presented as an appendix to the ATM Forum's PNNI specification. In general, on-demand routing performs a separate route computation for each requested route. On-demand routing according to this method optimizes on a single path constraint while pruning links that do not meet the caller's requirements. Although the method does exhibit good call blocking performance, it does not always find the optimal route. Moreover, because the method requires a route computation for each call, it is not well suited to high call rate, distributed architectures.

Another routing scheme proposed in the PNNI specification uses precomputed routes. In this case, sets of paths for each QoS (e.g., constant bit rate (CBR), real-time variable bit rate (RT-VBR), non-real-time variable bit rate (NRT-VBR), available bit rate (ABR) and unspecified bit rate (UBR)) are precalculated by computing the shortest path routes using a single optimization criteria for a single class of service. The routes provided are optimized without considering bandwidth (i.e., so long as a link has >0 bandwidth it is used for the shortest path computation) and the method falls back to on-demand routing every time the search of precomputed routes fails. Because bandwidth is not accounted for, on-demand routing tends to become the norm. Although useful for some applications, this method fails to provide a robust solution for high call rate applications, in part because it relies on on-demand routing (thus implicating the shortcomings of that solution) when no precomputed solution is available for a call request.

What is desired, therefore, is a robust routing methodology for high call rate applications in ATM or other networks that avoids the drawbacks of prior routing schemes.

SUMMARY OF THE INVENTION

The present invention provides a robust routing methodology for high call rate applications in ATM or other networks that avoids the drawbacks of prior routing schemes. In general, the routing scheme generates a selection of precomputed routes that provide a wide range of available bandwidths while keeping delay and delay variation, or cost, to a minimum, thus enabling high call rates at an overall lower call blocking rate than was achieved with schemes of the past. The routing scheme achieves this end by generating routes using a set of preconfigured bandwidth thresholds for pruning lower bandwidth links while least-cost optimizing on delay-based, or cost-based, optimization functions. In exemplary embodiments, the delay-based optimization functions may use a measure or estimate of maximum cell transfer delay (maxCTD), number of hops and/or maximum cell rate (maxCR). The cost-based optimization function may involve a measure of administrative weight (AW). The optimization function is determined during configuration by the selection of either cost-based or delay-based routing.

Thus, in one embodiment, the present invention allows for organizing a plurality of shortest path routes for a network computed according to a network constraint into two or more bandwidth brackets. The network constraint may be selected prior to the step of organizing and may be a delay-based constraint or a cost-based constraint. Where delay-based routing is used, preferably it is a function of CTD, number of hops and/or maxCR within the network. Alternatively, where cost-based routing is used, the cost-based constraint is preferably a function of the relative desirability of using a link or node within the network. The shortest path routes so computed may be searched, e.g., upon receipt of a call request, according to the bandwidth brackets, e.g., from lowest fit (i.e., the lowest bandwidth that will accommodate the request), to highest bandwidth bracket available.

In a further embodiment, a shortest path tree includes a plurality of shortest path routes for a network optimized according to a network constraint and organized into two or more bandwidth brackets. Again, the network constraint may be a delay- or cost-based constraint. The shortest path tree may be contained within a switch or other network node.

These and other features and advantages provided by the present invention will become apparent from a review of the detailed description and its accompanying drawings which follow.

BRIEF DESCRIPTION OF THE DRAWINGS

The present invention is illustrated by way of example, and not limitation, in the figures of the accompanying drawings in which.

DETAILED DESCRIPTION

Described herein is a routing scheme which provides quality of service sensitive routes precomputed in bandwidth brackets. This scheme provides a robust routing methodology for high call rate applications in ATM or other networks that avoids the drawbacks of prior routing schemes. In general, the routing scheme generates a selection of precomputed routes that provide a wide range of available bandwidths while keeping delay and delay variation (e.g., as measured by CTD and CDV), or cost, to a minimum, thus leading to an overall lower call blocking rate than was achieved by table-based routing schemes of the past. In one exemplary embodiment, the routing scheme achieves this end by generating routes using a set of preconfigured bandwidth thresholds for pruning lower bandwidth links while least-cost optimizing on delay-based optimization functions of maxCTD, the number of hops traversed and/or maxCR or a cost-based function of administrative weight (AW). The optimization function is determined during configuration by the selection of either cost-based or delay-based routing.

Figure 1:
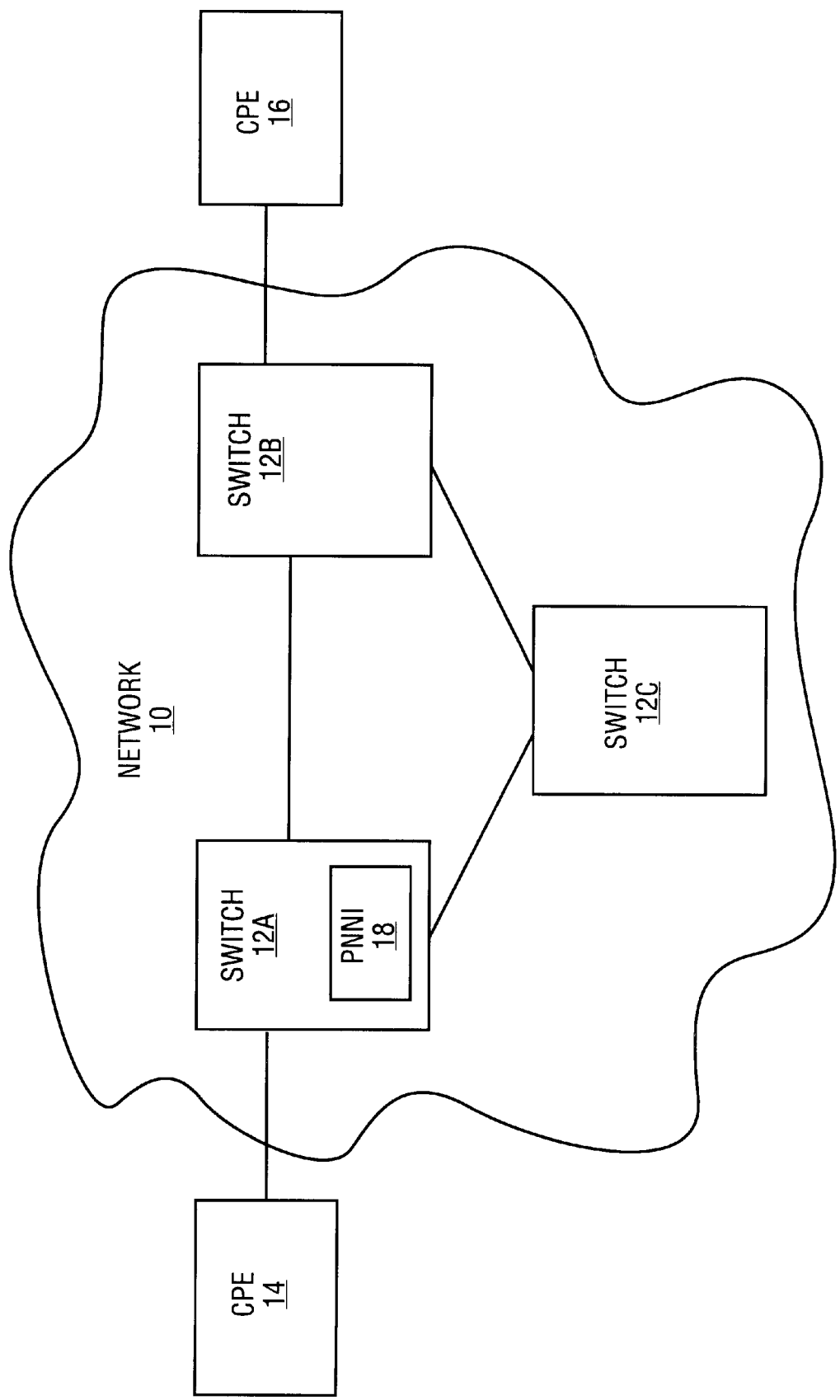
FIG. 1 illustrates an ATM network configured with a routing scheme in accordance with one embodiment of the present invention.

An exemplary call establishment procedure which makes use of the present routing scheme is shown in FIG. 1.

Network 10 is made up of three switches 12a, 12b and 12c. Of course, this is merely an example and, in practice, a network such as an ATM or other cell or packet switched network will be made up of a number of switches. Assume a user at customer premises equipment (CPE) 14 wishes to establish a connection with CPE 16. For example, a remote user at CPE 14 may wish to access a server at CPE 16. A call setup message from CPE 14 is delivered to switch 12a using a signaling PVC. When the signaling request is received, switch 12a will use PNNI routing agent 18 to determine whether a path through network 10 which meets the call request parameters (e.g., QoS, bandwidth, etc.) can be established. If no route can be found, then the call is blocked (cleared). If a path is found, a DTL is created for downstream nodes to follow and forwarded along the route.

To determine whether a path exists that will satisfy the call request, the PNNI routing agent 18 uses precomputed routing tables (called shortest path trees or SPTs) stored in memory at switch 12a to determine whether such a route can be established. The SPTs are precomputed for various bandwidth brackets using a shortest path algorithm, such as a Dijkstra calculation, to determine a path to CPE 16. This calculation will create a set of DTLs which define the available paths. Hence, using the precomputed quality of service sensitive routes as organized in bandwidth brackets, SVCs can be set up across network 10 to connect CPE 14 to CPE 16. Once the connection is established, ATM cells are forwarded between switches along the route by simple table lookups, e.g., using connection tables. In some caces, as discussed more fully below, no satisfactory route will be available from the SPTs. If certain conditions are met, PNNI routing agent 18 may make an on-demand shortest path computation in an attempt to establish a route that will satisfy the call request PNNI routing agent 18 is a relatively independent process within switch 12a and its main function is to create a routing database to be used by a connection manager within switch 12a for SVC connection requests. The routing agent 18 thus provides an interface between the PNNI protocol and the connection manager. As indicated above, when the routing agent 18 is invoked for a route request, it searches precalculated routing databases for the given destination along with the requested service class and traffic metric parameters. If there exists a satisfactory route, the associated DTL is returned as a response. If for some reason a downstream node rejects the call request (crankback), then the routing agent 18 of the source node provides another route that does not include the cranked back node(s) and/or link(s).

Figure 2:
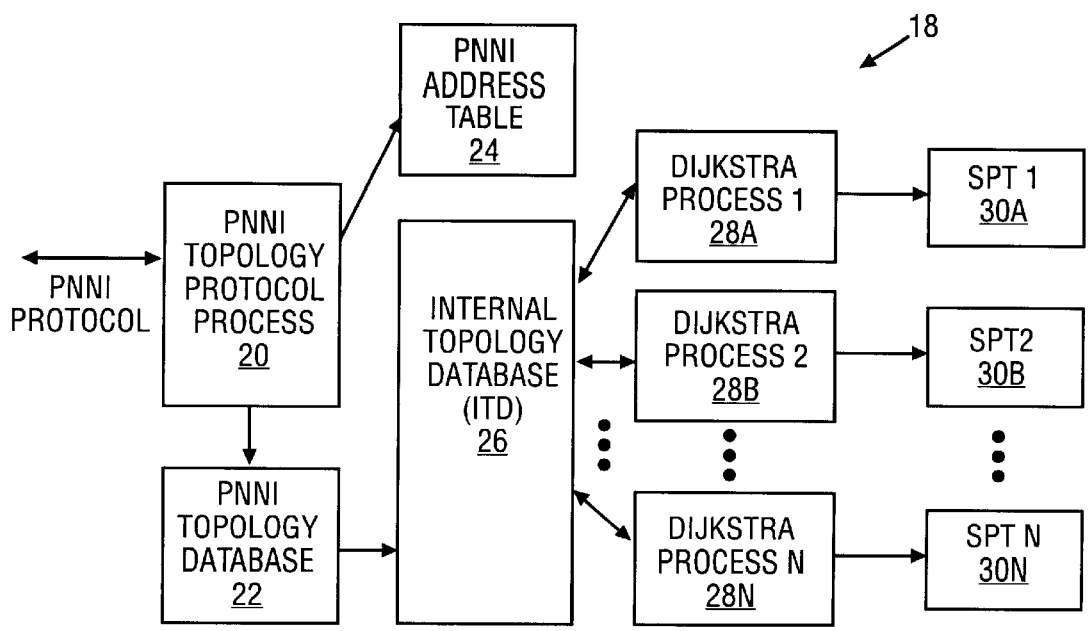
FIG. 2 illustrates a PNNI routing agent configured according to one embodiment of the present invention.

One exemplary embodiment of the PNNI routing agent 18 is shown in more detail in FIG. 2. As a result of the operation of the conventional PNNI topology protocol process 20, a PNNI topology database 22 is created and maintained at switch 12a (e.g., in memory). As indicated above, PNNI uses a reliable flooding mechanism to exchange topology information with other PNNI nodes (e.g., switches) in the same peer group. Thus, a PNNI topology or PTSE (PNNI topology state elements) database is maintained which stores the information received (and to be transmitted) during the flooding process. For this embodiment then, each PTSE in the topology database 22 is formatted to resemble a PNNI PTSE to make it more convenient for the flooding procedure.

Also as described above, each PNNI node has a default address. Additional addresses can be obtained via local and network management operations. These addresses are stored in a PNNI address table 24 and may also be used to originate associated PTSEs by the local node (e.g., switch 12a) and flooded to the peer group. The address table 24 thus stores all reachable addresses along with the node(s) via which they can be reached. Addresses so stored are used during a route search as discussed below.

An internal topology database (ITD) 26 is created for use as an input for the various Dijkstra processes 28a–28n. The Dijkstra processes 28a–28n are used to calculate the shortest path routes for the specified network constraint. There is a separate Dijkstra process 28 for each predefined bandwidth bracket, and each Dijkstra process 28 will generate its own SPT 30. Thus, multiple SPTs 30a–30n are maintained as outputs from the Dijkstra processes 28a–28n, with all SPT 30a–30n optimized on a specified constraint (e.g., a delay- or cost-based constraint). Each SPT 30a–30n describes the shortest path from the local node (e.g., switch 12a) to all other nodes for its respective constraint.

When a route request is received, the address table 24 is consulted to see if the destination node's address is present. If the destination node is found, it is noted and located in one or more of the associated SPTs 30a–30n, according to the requested bandwidth and other requirements. An SPT is chosen from among the available options (if more than one exists) and a DTL stack can then be derived. Each SPT 30a–30n may maintain multiple equal-cost paths, if any, and a number of equal-cost paths may be considered per SPT. Paths are considered as equal cost if the difference between their accumulated values on a specific constraint is less than or equal to a specified tolerance range.

Figure 3:
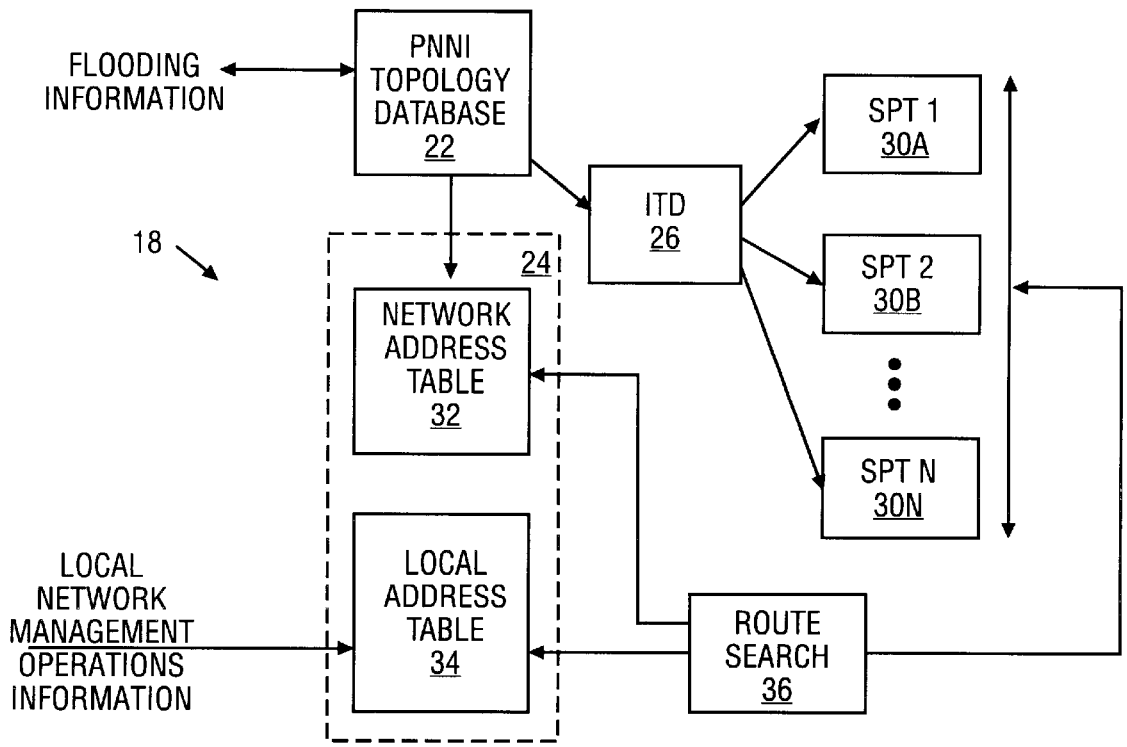
FIG. 3 illustrates a functional diagram for a PNNI routing agent's major data structures and interfaces according to one embodiment of the present invention.

FIG. 3 illustrates a functional diagram for PNNI routing agent 18 according to one embodiment of the present invention. PNNI topology database 22 is shown as being capable of receiving flooding information to allow for the exchange of topology information with other PNNI nodes in the same peer group. The address table 24 may be divided into a network address table 32 and a local address table 34. Locally obtained addresses are stored in the local address table 34 and, as indicated above, may also be used to originate associated PTSEs by the local node and flooded to the peer group. Addresses learned from the network are retrieved from the topology database 22 and stored in the network address table 32 for fast address searching during route searching. The local address table 34 may be used to route a local SVC call, i.e., local switching. For non-local switching calls, the network address table 32 is searched to find the destination node which advertises the associated address, and, if the destination node is found, one or mode SPTs 30a–30n may be searched using the route search routine 36 to find the path which meets the SVC call requirements to that destination node.

There are three scenarios for a route search. First, if the destination address finds a match in the local address table 34, the SVC call is forwarded to a local port at the source switch. Second, if there is a match in the network address table 34, the PNNI destination node is identified, a search in one or more of the SPTs 30a–30n is performed and, if a route is found, a DTL stack is constructed and the call is forwarded. Third, if no route is found, the call is blocked.

The present invention makes use of two strategies for route calculation (i.e., for creation of the SPTs 30a–30n): cost-based or delay-based. If cost-based routing is used, the SPT's constraint is Administrative weight (AW), if delay-based routing is used, the SNT's constraint is a function of CTD) and a function of maxCR and the number of hops to the destination. The traffic metrics and attributes (e.g., AW, CTD, CDV) may be configured on a per-PNNI trunk basis. Alternatively, some or all of these metrics and attributes may be measured directly and/or estimated. For example, CDV may be estimated using queue lengths or it may be measured using OAM cells. AvCR may be obtained from the connection manager associated with the source node and maxCR may be obtained from the source node directly. The operational state of a link may be obtained from a system manager.

The ATM Forum defines CTD as a measure of the elapsed time between a cell exit event (i.e., the time at which the first bit of an ATM cell has completed transmission out of an end-system or ATM network element to a public or private ATM network element across a UNI measurement point) at a first measurement point (e.g., a source UNI) and the corresponding cell entry event (i.e., the time at which the last bit of an ATM cell has completed transmission into an end-system or ATM network element from a public or private ATM network element across a UNI measurement point) at a second measutrement point (e.g., a destination UNI) for a particular connection. Thus, the CTD between two measurement points is the sum of the total inter-ATM node transmission delay and the total ATM node processing delay between the two measurement points. See, e.g., ATM Forum, *Traffic Management Specification* v4.0 (1996). CDV describes the variability in a pattern of cell arrival events observed at a measurement point.

For purposes of the present invention, maxCTD may be regarded as the sum of all fixed delay components across a link or node and CDV, measured in microseconds. The quantity is additive and can be accumulated during the Dijkstra calculation. maxCTD may be statically configured on per-trunk basis, based on distance traversed by a link, or, as indicated above, it may be measured. CDV then, may reflect the difference between the average CTD and maxCTD, measured in microseconds. It is also additive and can be accumulated during path selection in the Dijkstra calculation. CDV may be statically configured on per-trunk basis, based on queuing delay, or, as indicated above, it too may be a measured value. maxCR may be the maximum capacity usable by PNNI for SVCs. It is measured in cells per second and is the size of a partition reserved for SVCs. AvCR is a measure of effective available capacity measured in cells per sec.

Administrative weight is a value assigned to indicate the relative desirability of using a link or node. It is a dimensionless quantity. It is additive and can be aggregated during path selection in the Dijkstra calculation. If set to 1 on every link, the accumulated value becomes a hop count.

For the illustrated embodiment then, the Dijkstra algorithm is used to calculate routes from the local node to each reachable destination node. There may be a single Dijkstra process 28 for each of a number of bandwidth brackets (i.e., SPTs 30a–30n may be created using a single Dijkstra process 28 optimized to a specified delay- or cost-based constraint and bandwidth). Alternatively, a set of Dijkstra processes 28a–28n may be used to create SPTs 30a–30n for each specified constraint, and the SPTs 30a–30n further organized into a number of bandwidth brackets. The input for the Dijkstra processes 28a–28n is the PNNI topology database, which, in order to benefit execution speed, may be reformatted to a separate memory space as ITD 26. The output from each Dijkstra process 28a–28n is an SPT 30a–30n. The individual constraints used by each Dijkastra process 28a–28n are configurable parameters.

For delay-based routing, the constraint (i.e., the primary shortest path optimization objective) may be identified by cell transfer delay (e.g., maxCTD). To help satisfy the requirement for reduced delay variation, a small factor that may be a function of a link's maxCR is included. Using this second factor, when two paths with the same aggregate maxCTD are available, the path with the least number of hops and/or the largest bandwidth links will have the lowest cost. Cell delay variation is reduced by both reducing the number of hops and routing over faster links. This second factor is known as the "per-hop penalty" or PHP. In general, the calculation for the delay-based routing constraint on each link is defined as:

$$\text{link\_CTD} + \text{PHP},$$

where link_CTD is the CTD on that link, and PHP is, for one embodiment, defined as:

2000 $\mu$sec if maxCR>1,000,000 cells per sec;
4000 $\mu$sec if maxCR>1000,000 cells per sec;
10,000 $\mu$sec if maxCR>10,000 cells per sec; and
15,000 $\mu$sec if maxCR$\leq$10,000 cells per sec.

As indicated above, the delay-based routing constraint is additive.

For cost-based routing, AW is the single constraint. It is also additive and connection acceptance is determined by a node-based variable. Note that the cost-based routing function uses only AW as the optimization objective, so PHP is not used.

The concept of bandwidth brackets or thresholds is introduced to control the minimum bandwidth of routes precomputed by the shortest path algorithms. For example, a preconfigured bandwidth threshold of 100 Kbps directs the routing algorithm to create a set of paths to all destinations with at least 100 Kbps bandwidth. The bandwidth thresholds apply to routes generated using delay-based routing or cost-based routing. In one embodiment, the default bandwidth thresholds are spread logarithmically and generate precomputed routes where:

available bandwidth of each path is non-zero;
available bandwidth of each path is at least 100 Kbps;
available bandwidth of each path is at least 1 Mbps; and
available bandwidth of each path is at least 10 Mbps.

Thus, the individual SPTs 30a–30n are categorized not only by optimization constraint, but also are qualified by bandwidth brackets.

To summarize, Dijkstra's algorithm is used to precalculate bandwidth bracketed routes from the local node to each reachable destination node. In one embodiment, the output of each Dijkstra calculation is an SPT with its root at the local node and branches spanning outward towards all other nodes. Each SPT may accommodate multiple paths to the same destination within a bandwidth bracket. The Dijkstra processes 28a–28n use the following rules for generating both delay-based and cost-based SPTs:

If a link's AvCR is zero, do not use it;
If a link's AvCR is below the predetermined bandwidth threshold for this SPT, do not use it; and
A path is replaced on the SPT by another path where the accumulated optimizing function is better.

A configurable tolerance value for the accumulated cost is used. Paths are considered equal-cost if the difference between their accumulated values are within the tolerance. All (or some) equal-cost paths are maintained in a single SPT. The equal-cost tolerance is configurable on a per node basis. The setting of this value will control the number of alternate routes contained in each SPT 30a–30n. A small value will result in fewer alternate routes than a large value. In this way, a network administrator can trade off setup time and SPT size with the ability to balance loads across paths with similar QoS characteristics.

Figure 4:
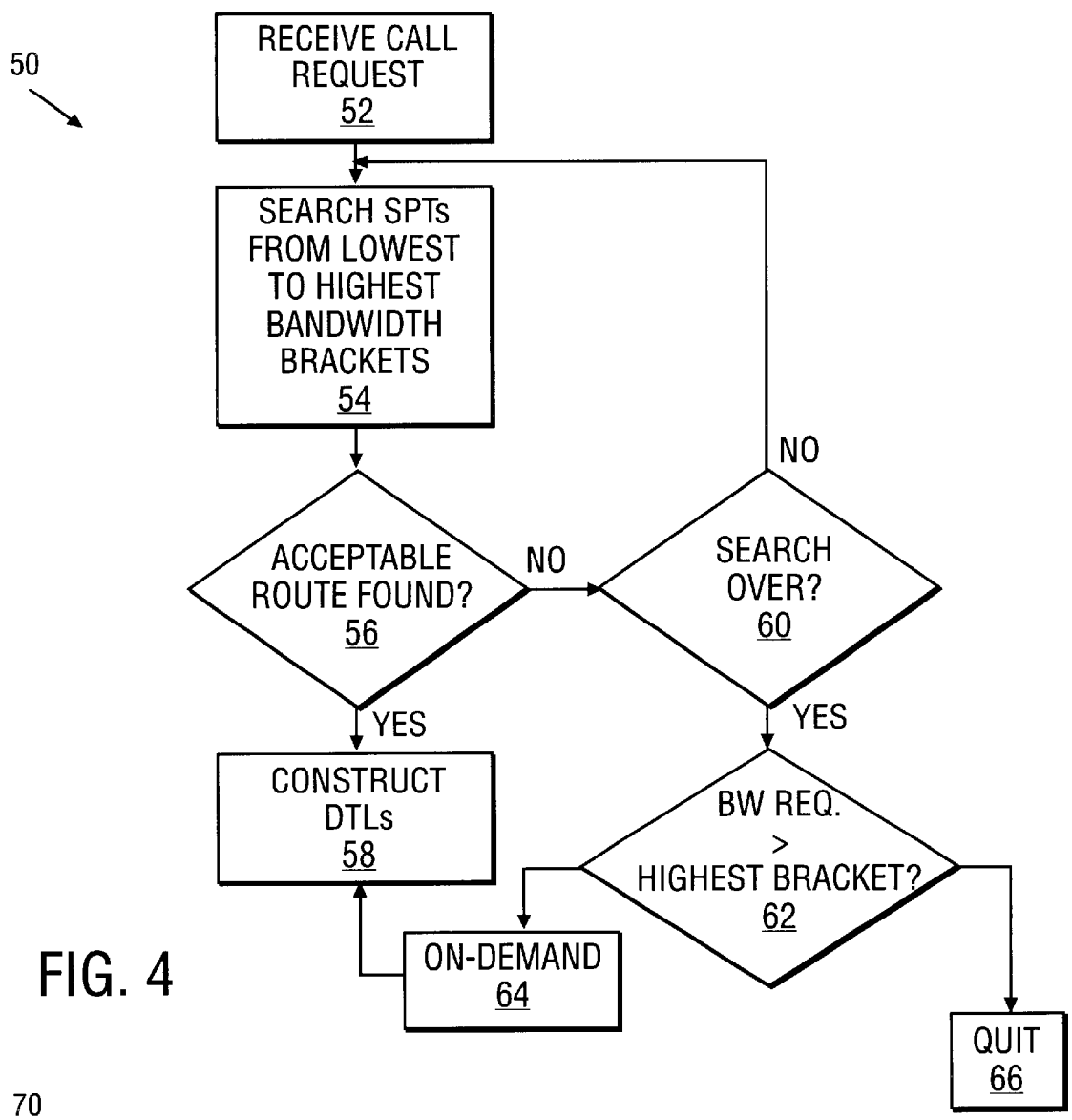
FIG. 4 illustrates a process for routing a connection within a network in accordance with one embodiment of the present invention.

FIG. 4 now illustrates a process 50 for selecting a route for a connection in accordance with one embodiment of the present invention. When a call processing entity requests a route, step 52, the route search algorithm 36 searches each SPT 30a–30n from lowest fit to highest bandwidth, step 54. If an acceptable route to the destination node is found, step 56, the DTLs are constructed to configure the selected path, step 58. If no acceptable route to the destination node is found, step 60, a check is made at step 62 to determine whether the bandwidth requested exceeds the highest available bandwidth bracket. If so, the process resorts to on-demand routing, step 64, for the call request. Otherwise, the process quits, step 66, and the call request is blocked.

As indicated above, within an SPT, a selection of alternate equal-cost paths may be provided. This makes it possible to share loads between paths with equal cost. When an SPT provides multiple equal-cost paths as determined by the equal-cost tolerance parameter, a path is chosen from the selection at random. A random choice is used because, in the absence of valid link state information, which is the case when many connections are being routed over the same path in a short time, a random choice has been found to distribute the load better than a choice based on stale link state information. Of course, other equal-cost path selection processes could be used.

At steps 54–56, the path selection algorithm 38 accesses the SPTs 30a–30n sequentially until an acceptable route is found or all SPTs have been accessed. In one embodiment, four delay- or cost-based SPTs are implemented:

SPT with non-zero bandwidth;
SPT with at least threshold_1 (100K) bandwidth;
SPT with at least threshold_2 (1M) bandwidth; and
SPT with at least threshold_3 (10M) bandwidth.

There will be cases where the SPTs 30a–30n will not be able to supply a route with enough bandwidth to satisfy a call request, even when sufficient bandwidth is available in the network. This can occur if a call's request for bandwidth exceeds the bandwidth threshold for the SPT and no higher bandwidth SPT is available. In such cases, i.e., when a route cannot be found in the SPTs 30a–30n and the requested bandwidth exceeds the highest bandwidth brackets of the SPTs, an on-demand route computation is performed. The configuration of the bandwidth thresholds controls the frequency of these on-demand computations. The need for an on-demand computation will occur infrequently, unless the bandwidth brackets are set too low. It is important to note that on-demand computations are not performed every time a route search fails. This can result in inefficient use of bandwidth resources and a global increase in call blocking.

Thus, for a route search for a specified SVC connection request, the metrics requested are identified and one or more SPTs 30a–30n are searched. A route is searched for using the following rules:

1. Check if a node/link is marked as a failure from crankback information;

2. If AvCR is advertised on a link, check if the route meets the caller's requirements and exclude if not;

3. The order of the SPTs where the route is searched to satisfy the bandwidth requested is from low to high, irrespective of whether cost- or delay-based routing is used; and 4. load balancing is provided by choosing a random number between all equal-cost paths for a particular connection.

The present routing scheme has advantages over routing schemes of the past in three major areas. First, the present solution provides separate SPTs with precomputed routes based on the bandwidth the routes can provide. This results in a more diverse selection of paths, thus increasing the probability that an acceptable route will be found without having to resort to an on-demand computation. Schemes of the past provide separate routes based on only one path constraint such as CTD, CDV or AW and do not take bandwidth brackets into account.

Second, the present routing scheme uses a function of delay, number of hops and link speed to compute the best QoS sensitive routes for all SPTs. This implies that all traffic classes will be routed efficiently even if, as is the case for ABR and UBR traffic, the service class does not require an efficient route. Schemes of the past used one path constraint to generate a set of precomputed routes for each service class supported. This tended to result in selecting routes less efficient than otherwise possible for less demanding service classes. In other words, a route may have satisfied the call request but it may not have been "socially" efficient in using network resources. By making use of only delay, number of hops and link speed, the present scheme is also somewhat easier to implement than those of the past. For example, link speed is generally known, and link propagation delay, which can be measured directly or estimated, can be used for the delay variable. Schemes of the past which relied on accurate measures or estimates of CDV tended to be somewhat more difficult to implement.

Third, the present solution does not always fall back to on-demand routing whenever the precomputed route lookup fails. Only when the lookup fails and the requested bandwidth exceeds the bandwidth bracket of the highest bandwidth SPT is an on-demand computation made. This greatly reduces the frequency of on-demand computations from what was experienced using schemes of the past. This is important because excessive use of on-demand computations not only results in reduced call processing rates (undesirable in high call rate applications), but also results in higher overall call blocking rates when a network is heavily loaded and the on-demand routes become inefficient. Thus, use of a scheme according to the present invention will enable the handling of higher call processing rates without sacrificing call blocking performance.

Figure 5:
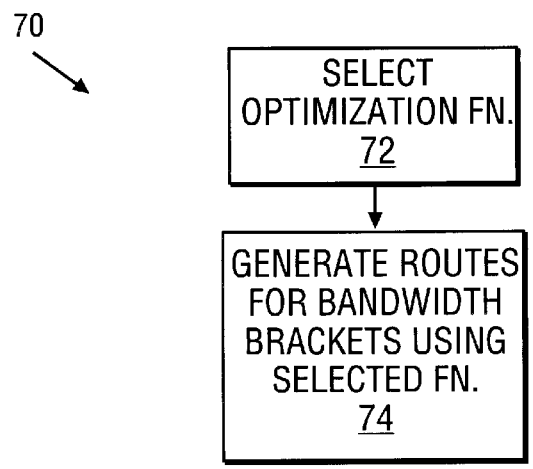
FIG. 5 illustrates a process for computing bandwidth bracketed routes for a cell or packet switched network in accordance with one embodiment of the present invention.

Thus, a routing scheme which provides quality of service sensitive routes precomputed in bandwidth brackets has been described. As discussed above, in an exemplary embodiment, now illustrated in FIG. 5, the present invention computes, process 70, bandwidth bracketed routes for a cell or packet switched network by first selecting an optimization function or constraint for a shortest path computation, step 72, and then computing available routes (in the form of SPTs) for the various bandwidth brackets using the selected optimization function or constraint, step 74. These results can then be searched upon receipt of a call request and, if available, a precomputed route provided therefrom. Although discussed with reference to specific illustrated embodiments, the generality of present invention should not be limited thereby. Instead, the present invention should only be measured in terms of the claims which follow.

What is claimed is:

1. A method, comprising organizing a plurality of shortest path routes for a network computed according to a network constraint into two or more bandwidth brackets, each bandwidth bracket including a lower bandwidth threshold and an upper bandwidth threshold.

2. The method of claim 1 further comprising selecting the network constraint prior to the step of organizing.

3. The method of claim 1 further comprising searching the shortest path routes according to the bandwidth brackets upon receipt of a call request for a route within the network.

4. The method of claim 2 wherein the network constraint is a delay-based constraint.

5. The method of claim 4 wherein the delay-based constraint comprises a function of cell transfer delay and a computed per-hop penalty (PHP) within the network.

6. The method of claim 5 wherein the PHP is computed as a function of a maximum cell rate.

7. The method of claim 2 wherein the network constraint is a cost-based constraint.

8. The method of claim 7 wherein the cost-based constraint comprises a function of the relative desirability of using a link or node within the network.

9. The method of claim 3 further comprising configuring an on-demand route when none of the shortest path routes satisfy the call request and a bandwidth requested in the call request exceeds a highest of the bandwidth brackets.

10. The method of claim 3 further comprising blocking the call request when none of the shortest path routes satisfy the call request but a bandwidth requested in the call request does not exceed a highest of the bandwidth brackets.

11. The method of claim 3 further comprising selecting one of the shortest path routes in response to a call request for a route within the network.

12. The method of claim 11 wherein the step of selecting comprises sequentially searching the shortest path routes until an acceptable route is found.

13. The method of claim 12 further comprising randomly selecting one of a number of routes when more than one route having the same cost according to the network constraint is found during the step of sequentially searching.

14. The method of claim 13 further comprising configuring an on-demand route when none of the shortest path routes satisfy the call request and a bandwidth requested in the call request exceeds a highest of the bandwidth brackets.

15. The method of claim 12 further comprising blocking the call request when no acceptable route is found and a bandwidth requested in the call request does not exceed a highest of the bandwidth brackets.

16. The method of claim 12 further comprising configuring an on-demand route when no acceptable route is found and a bandwidth requested in the call request exceeds a highest of the bandwidth brackets.

17. A shortest path tree comprising a plurality of shortest path routes for a network optimized according to a network constraint and organized into two or more bandwidth brackets, each bandwidth bracket including a lower bandwidth threshold and an upper bandwidth threshold.

18. The shortest path tree of claim 17 wherein the network constraint is a delay-based constraint.

19. The shortest path tree of claim 18 wherein the delay-based constraint comprises a function of cell transfer delay and a computed per-hop penalty (PHP) within the network.

20. The shortest path tree of claim 19 wherein the PHP is computed as a function of a maximum cell rate.

21. The shortest path tree of claim 17 wherein the network constraint is a cost-based constraint.

22. The shortest path tree of claim 21 wherein the cost-based constraint comprises a function of the relative desirability of using a link or node within the network.

23. The shortest path tree of claim 17 wherein the shortest path routes are organized into four bandwidth brackets.

24. A switch configured to compute a shortest path tree having a plurality of shortest path routes for a network optimized according to a network constraint and organized into two or more bandwidth brackets, each bandwidth bracket including a lower bandwidth threshold and an upper bandwidth threshold.

25. The switch of claim 24, wherein the switch is further configured to block a call request when none of the shortest path routes satisfy the call request but a bandwidth requested in the call request does not exceed a highest of the bandwidth brackets.

26. The switch of claim 24, wherein the switch is further configured to route a call request on demand when none of the shortest path routes satisfy the call request but a bandwidth requested in the call request exceeds a highest of the bandwidth brackets.

27. The switch of claim 24, wherein the switch is further configured to randomly select one of a number of equal-cost routes when more than one route having the same cost according to the network constraint is found in response to a call request.

28. A method, comprising creating a plurality of shortest path routes for a network computed according to a network constraint and a plurality of bandwidth brackets, each bandwidth bracket including a lower bandwidth threshold and an upper bandwidth threshold.

29. The method of claim 28 further comprising selecting the network constraint prior to the step of creating the plurality of shortest path trees.

30. The method of claim 28 further comprising searching the shortest path routes by bandwidth bracket upon receipt of a call request for a route within the network.

31. The method of claim 29 wherein the network constraint is a delay-based constraint.

32. The method of claim 31 wherein the delay-based constraint comprises a function of cell transfer delay and a computed per-hop penalty (PHP) within the network.

33. The method of claim 32 wherein the PHP is computed as a function of a maximum cell rate.

34. The method of claim 29 wherein the network constraint is a cost-based constraint.

35. The method of claim 34 wherein the cost-based constraint comprises a function of the relative desirability of using a link or node within the network.

36. The method of claim 30 further comprising configuring an on-demand route when none of the shortest path routes satisfy the call request and a bandwidth requested in the call request exceeds a highest of the bandwidth brackets.

37. The method of claim 30 further comprising blocking the call request when none of the shortest path routes satisfy the call request but a bandwidth requested in the call request does not exceed a highest of the bandwidth brackets.

38. The method of claim 30 further comprising selecting one of the shortest path routes in response to a call request for a route within the network.

39. The method of claim 38 wherein the step of selecting comprises sequentially searching the shortest path routes until an acceptable route is found.

40. The method of claim 39 further comprising randomly selecting one of a number of routes when more than one route having the same cost according to the network constraint is found during the step of sequentially searching.

41. The method of claim 40 further comprising configuring an on-demand route when none of the shortest path routes satisfy the call request and a bandwidth requested in the call request exceeds a highest of the bandwidth brackets.

42. The method of claim 40 further comprising blocking the call request when no acceptable route is found and a bandwidth requested in the call request does not exceed a highest of the bandwidth brackets.

43. The method of claim 41 further comprising configuring an on-demand route when no acceptable route is found and a bandwidth requested in the call request exceeds a highest of the bandwidth brackets.

* * * * *